(12) United States Patent
Segiet et al.

(10) Patent No.: US 10,349,773 B2
(45) Date of Patent: Jul. 16, 2019

(54) BEVERAGE DISPENSER SYSTEMS AND METHOD FOR PRODUCING A BEVERAGE

(71) Applicant: PEPSICO, INC., Purchase, NY (US)

(72) Inventors: William Segiet, Bethel, CT (US); Vikas Sharma, Branchburg, NJ (US); Maher Nachawati, Samford, CT (US)

(73) Assignee: PepsiCo, Inc., Purchase, NY (US)

( * ) Notice: Subject to any disclaimer, the term of this patent is extended or adjusted under 35 U.S.C. 154(b) by 299 days.

(21) Appl. No.: 15/388,882

(22) Filed: Dec. 22, 2016

(65) Prior Publication Data

US 2018/0177329 A1 Jun. 28, 2018

(51) Int. Cl.
*A47J 31/40* (2006.01)
*A47J 31/44* (2006.01)

(52) U.S. Cl.
CPC ......... *A47J 31/407* (2013.01); *A47J 31/4403* (2013.01)

(58) Field of Classification Search
CPC ........................... A47J 31/407; A47J 31/4403
See application file for complete search history.

(56) References Cited

U.S. PATENT DOCUMENTS

| | | | |
|---|---|---|---|
| 2005/0126399 A1 | 6/2005 | Bragg et al. | |
| 2006/0123998 A1* | 6/2006 | Castellani | A47J 31/0673 99/495 |
| 2014/0030404 A1 | 1/2014 | Sullivan et al. | |
| 2016/0029686 A1 | 2/2016 | Hecht et al. | |

OTHER PUBLICATIONS

Notification of Transmittal of the International Search Report and the Written Opinion of the International Searching Authority, or the Declaration, International Application No. PCT/US17/62319, 13 pages.

* cited by examiner

*Primary Examiner* — Anthony J Weier
(74) *Attorney, Agent, or Firm* — Sterne, Kessler, Goldstein & Fox P.L.L.C.

(57) ABSTRACT

A beverage dispenser is provided. The beverage dispenser can include a bar gun holster, a bar gun cradle, an armature, and a cartridge nest having a receiving portion for receiving a portion of a single serve beverage ingredient cartridge. The device can include a puncturing device to puncture the cartridge thereby releasing the beverage ingredient.

20 Claims, 8 Drawing Sheets

BEVERAGE DISPENSER SYSTEMS AND METHOD FOR PRODUCING A BEVERAGE

BACKGROUND

Field

Embodiment of the present invention relate to a beverage dispenser. In particular, embodiments relate to a dispenser utilizing a single use pod or package and methods using a beverage dispenser.

BRIEF SUMMARY OF THE INVENTION

One aspect of the invention permits a beverage dispenser comprising a tower member, an armature pivotably connected to the tower member, and a stationary platform fixed to the tower member, the stationary platform being configured to retain a bar gun. The beverage dispenser can include a cartridge platform pivotably connected to the tower member, and a linkage pivotably connected to the armature. The linkage can include a guide bearing that travels in a channel formed in the cartridge platform between a first channel end and a second channel end to open and close the cartridge platform based on a position of the armature.

In another aspect, the beverage dispenser includes a bar gun cradle to hold a bar gun handle, and a bar gun holster to hold a bar gun nozzle. In a further aspect, the beverage dispenser can include a first solenoid to actuate a first bar gun button, wherein the first solenoid can be controlled by a first input positioned on the armature. The beverage dispenser can include a second solenoid to actuate a second bar gun button, where the second solenoid can be controlled by a second input positioned on the armature.

The beverage dispenser can also include a puncturing device to puncture a cartridge containing a beverage ingredient to release the beverage ingredient, a cartridge coupling portion connected to the stationary platform to releasably couple to the cartridge, and a cartridge nest having a receiving portion for receiving a portion of the cartridge. The puncturing device can be configured to puncture the cartridge thereby releasing the beverage ingredient.

In another aspect, activation of the first solenoid pushes a fluid through the bar gun nozzle and cartridge, thereby mixing the beverage ingredient and fluid. The cartridge nest can be movable relative to the cartridge coupling portion such that cartridges can be loaded and unloaded into the cartridge nest. The cartridge can contain a single serving of beverage ingredient. In another aspect, the cartridge can include one of a bag, shell, pod, and box. The cartridge can be reusable.

In a further aspect, a beverage dispensing system can include a tower member, an armature pivotably connected to the tower member, a stationary platform fixed to the tower member, a bar gun cradle positioned on the stationary platform, a bar gun holster positioned on the stationary platform, a cartridge coupling portion positioned on the stationary platform, a cartridge platform pivotably connected to the tower member, a linkage pivotably connected to the armature, the linkage including a guide bearing to travel in a channel formed in the cartridge platform between a first channel end and a second channel end to open and close the cartridge platform based on a position of the armature, a bar gun having a handle positioned on the bar gun cradle and a nozzle positioned within the bar gun holster, a puncturing device configured to puncture a cartridge containing a beverage ingredient thereby releasing the beverage ingredient, and a cartridge nest positioned on the cartridge platform, the cartridge nest having a receiving portion for receiving a portion of the cartridge.

In another aspect, the beverage dispensing system can include a first input positioned on the armature to control a first solenoid to activate a first bar gun button to push a first fluid through the bar gun nozzle and cartridge, thereby mixing the beverage ingredient and first fluid.

In another aspect, the beverage dispensing system can include a first input positioned on the armature to control a first solenoid to activate a first bar gun button to push a first fluid through the bar gun nozzle and cartridge, thereby mixing the beverage ingredient and first fluid, and a second input positioned on the armature to control a second solenoid to activate a second bar gun button to push a second fluid through the bar gun nozzle and cartridge, thereby mixing the beverage ingredient and fluid.

In another aspect, the cartridge nest can be movable relative to the cartridge coupling portion such that cartridges can be loaded and unloaded into the cartridge receiving portion.

In a further aspect, a method for producing a beverage can include placing a bar gun having a bar gun nozzle and a bar gun handle on a stationary platform of a dispenser, the stationary platform being fixed to a tower member and having a cartridge coupling portion, positioning a cartridge within a cartridge nest attached to a cartridge platform pivotably connected to the tower member, the cartridge nest having a receiving portion for receiving a portion of the cartridge, moving an armature downward toward a tower member base such that the armature rotates about a pin connecting the armature to the tower member, the armature being pivotably connected to a linkage such that moving the armature downward moves the linkage downward, the linkage having a guide bearing that travels along a channel positioned in a cartridge platform toward a first channel end such that moving the armature downward draws the cartridge platform upward into engagement with the cartridge coupling portion to releasably couple to the cartridge, puncturing the cartridge with a puncturing device to release a beverage ingredient from the cartridge, and flowing a diluent to allow the diluent to mix with the beverage ingredient and produce a finished beverage.

The method can include selecting an input corresponding to a first diluent to push the first diluent into the nozzle thereby mixing the beverage ingredient and first diluent. The method can include providing a first input corresponding to a first diluent, providing a second input corresponding to a second diluent, and selecting the first input or the second input to push the first diluent or the second diluent into the bar gun nozzle thereby mixing the beverage ingredient and first diluent or the second diluent.

The method can include moving the armature upward away from the tower member base such that moving the armature upward moves the linkage upward and the guide bearing travels toward a second channel end allowing the cartridge platform to move downward and disengage from the cartridge coupling portion, removing the punctured cartridge, positioning a second cartridge within the cartridge nest, moving the armature downward toward the tower member base to move the linkage downward such that the guide bearing travels along the channel toward the first channel end to draw the cartridge platform upward into engagement with the cartridge coupling portion to releasably couple to the second cartridge, puncturing the second cartridge with the puncturing device to release a second beverage ingredient from the second cartridge, flowing the diluent to allow the diluent to mix with the second beverage ingredient and produce a second finished beverage. In another aspect, the cartridge nest can move to a position within a tower member orifice when the armature is moved upward. In another aspect, selecting the input can activate a solenoid to engage a bar gun button to push the first diluent into the nozzle.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

Features and advantages of the embodiments will become more apparent from the detailed description set forth below when taken in conjunction with the drawings, in which like reference characters identify corresponding elements throughout.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Beverage dispensing units have become a popular way for food and beverage establishments to create on-site fountain beverages. Typically, these units include several bag-in-box containers that each contains syrup, a liquid source that dispenses a liquid, a mixing unit, and a dispensing unit. Syrup is pumped from the bag-in-box container into the mixing unit where it is mixed with liquid to form a beverage that is then dispensed through the dispensing unit. Typically, a pump causes the syrup to be released from the bag-in-box container into the mixing unit.

Conventional beverage dispensing units and systems position the bag-in-box containers and the pump in a back room, such as a storage room or food preparation area, because they can be noisy and can be distracting to patrons. The dispensing unit is oftentimes positioned in the foodservice area of the restaurant or bar so that staff and/or patrons may have access to it. This unit is time-consuming to assemble, disassemble, and service because it is positioned in multiple rooms and because portions of the unit are difficult to access. Assembly, disassembly, and service of this beverage dispensing unit are oftentimes performed by a highly skilled technician due to the complex nature of the unit.

Many carbonated and noncarbonated beverages are available on the market and are in demand. For example, restaurants, cafeterias, fast food facilities, and the like often utilize beverage dispensers to provide such beverages to their customers (either from behind the counter or self-serve). These dispensers often used "post-mix" beverage dispensing valves, which use two separate flow paths to dispense water (carbonated or non-carbonated, depending on the type of beverage) and syrup into a cup, in which the water and syrup mix to produce a beverage. Alternatively, "pre-mix" dispensers may dispense pre-mixed beverages.

Typically, post-mix beverage dispensing valves dispense only one beverage flavor per valve. The number of these "one-flavor" valves that a dispenser can accommodate is limited, and thus the valves are assigned to the most popular flavors, typically carbonated beverages (cola, diet cola, lemon-lime, root beer, etc.). Additional noncarbonated beverage flavors (e.g., iced tea, lemonade, pink lemonade, fruit punch, raspberry iced tea, etc.), require additional dispensers. In many cases, these dispensers are dedicated to a single flavor, to prevent mixing flavors between beverage dispensing cycles. This takes up additional counter space, and increases beverage dispensing cost.

Many food service areas and restaurants utilize a bar gun to prepare and serve post-mix beverages. Bar guns are used to mix and dispense a beverage from a nozzle. Bar guns are flexible hoses terminating in a dispense head having a number of buttons. Both still and carbonated water is fed to the head along the flexible stem. A number of syrups or concentrates are also fed along the stem. By selectively pressing the individual buttons on the bar gun head, valves are opened to permit the flow of concentrate and diluent to form the post mix drink.

As with typical post-mix beverage dispensers, bar guns beverage offerings are limited to pre-selected syrup concentrates that feed to the bar gun nozzle. A food service area or restaurant may wish to provide additional beverages and or beverage flavors without having to add another syrup concentrate supply to the bar gun.

In addition, the food service area or restaurant may provide limited time offer ("LTO") beverage products in bottle and cans. It may offer a refreshing new flavor for a limited time allowing incremental volume through the generation of interest in something new and novel. Restricting access to certain products may drive demand, and can be advantageous for a company. The currently existing post-mix beverage dispensing equipment, including bar guns, generally can only deliver what is already in a line requiring that a technician flush or replace certain supply lines such as syrup lines and load the new product. It can be advantageous to allow foodservice customers to offer tailored products through single or multi serve packages allowing limited time offers for their consumers, without the need for such an intensive system overhaul.

Due to the infrastructure and nature of the systems, sometimes it is less desirable to provide for additional beverages, beverage flavors, and LTOs in a food and beverage setting (e.g., restaurant, convenience store, grocery, or the like) due to the changeover cost and equipment replacement. A rotating dispenser offering different beverages and/or flavors may require components such as the syrup line to be replaced to avoid flavor cross-contamination from previous syrup flavors run through the line. Standard post mix systems can generally only dispense syrup products that are pumped through a line. A time intensive and complicated changeover is required to change flavors and flavor carryover becomes a risk when switching from pungent flavors to lighter flavors which necessitates line changes.

Additionally, less utilized beverages and flavors can be prone to expiration and can thus be less ideal in a post-mix environment with respect to supply chain and shelf life management perspective. Utilizing single serve packages or the systems herein reduce wasted product and divide units to make inventory management simpler in a smaller format.

The present dispenser delivers the capability of dispensing a finished beverage, a semi-finished beverage, or a flavor using a single serve package containing a syrup, or concentrate through a bar gun post mix valve. Carbonated water, still water or a semi-finished beverage flows from the bar gun through the single serve package, in the form including but not limited to a concentrate cartridge, pod, or packet.

A single serve form factor can potentially eliminate large packs of syrups and flavors behind the counter in a food and beverage setting and can deliver a finished beverage on demand. A standard bar gun post mix valve system only delivers beverages or water based on the concentrate in the Bag-in-Box, connected through a plumbed line. Just leveraging the still or carbonated water, this present system can deliver additional single flavor or multi-flavor beverages using the cartridge, pod, or package.

According to some aspects of the invention, the dispenser can be a standalone dispensing system which could serve a complete beverage or partial flavor, sweetener or a nutritive additive that can be mixed with other non-alcoholic or alcoholic beverage. The system can have a cradle to hold the bar gun. The system can utilize a clam shell armature that clamps down on the bar gun to hold the bar gun in place on the bar gun cradle and bar gun holster. The upper portion of the armature can include one or more solenoids to activate the bar gun soda or water button, based on the desired type of beverage.

There on, the system can include a linkage to utilize a cartridge nest that can hold a cartridge, pod, or packet. When the armature is lowered, the nest is brought up to the puncturing portion of the system that breaks open the cartridge pod from the top and bottom while simultaneously activating the soda or water button on the bar gun handle, thus allowing diluent to flow through the cartridge to create a finished beverage.

Simultaneously, the upper armature can activate the soda or water button through the actuation of a solenoid driven shaft that depresses the soda or water button, depending on the selection of the system. That actuation can be timed using a timer thus allowing control of the soda or water ratio.

These and other embodiments are discussed below with reference to the figures. However, those skilled in the art will readily appreciate that the detailed description given herein with respect to these figures is for explanatory purposes only and should not be construed as limiting.

Figure 1:
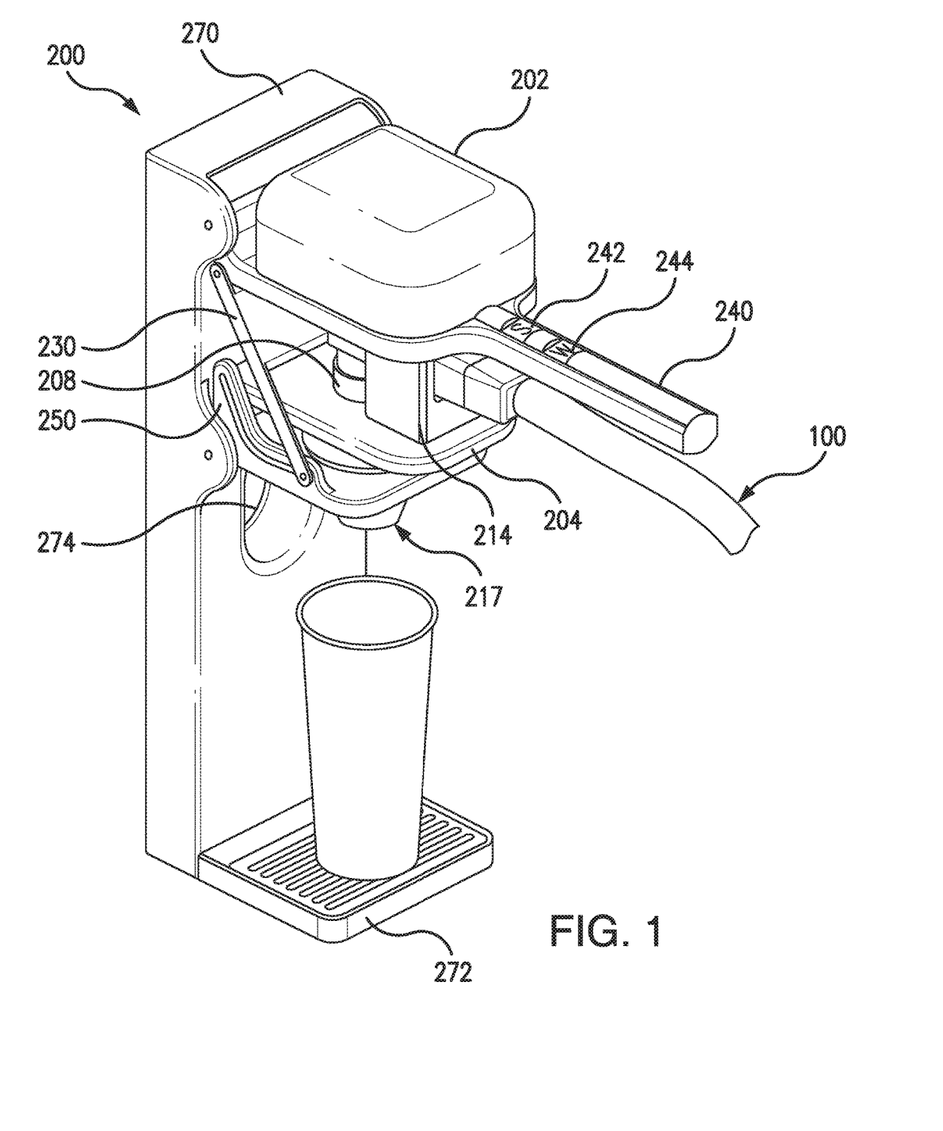
FIG. 1 is a perspective view of a beverage dispenser according to various aspects of the invention.
Figure 4:
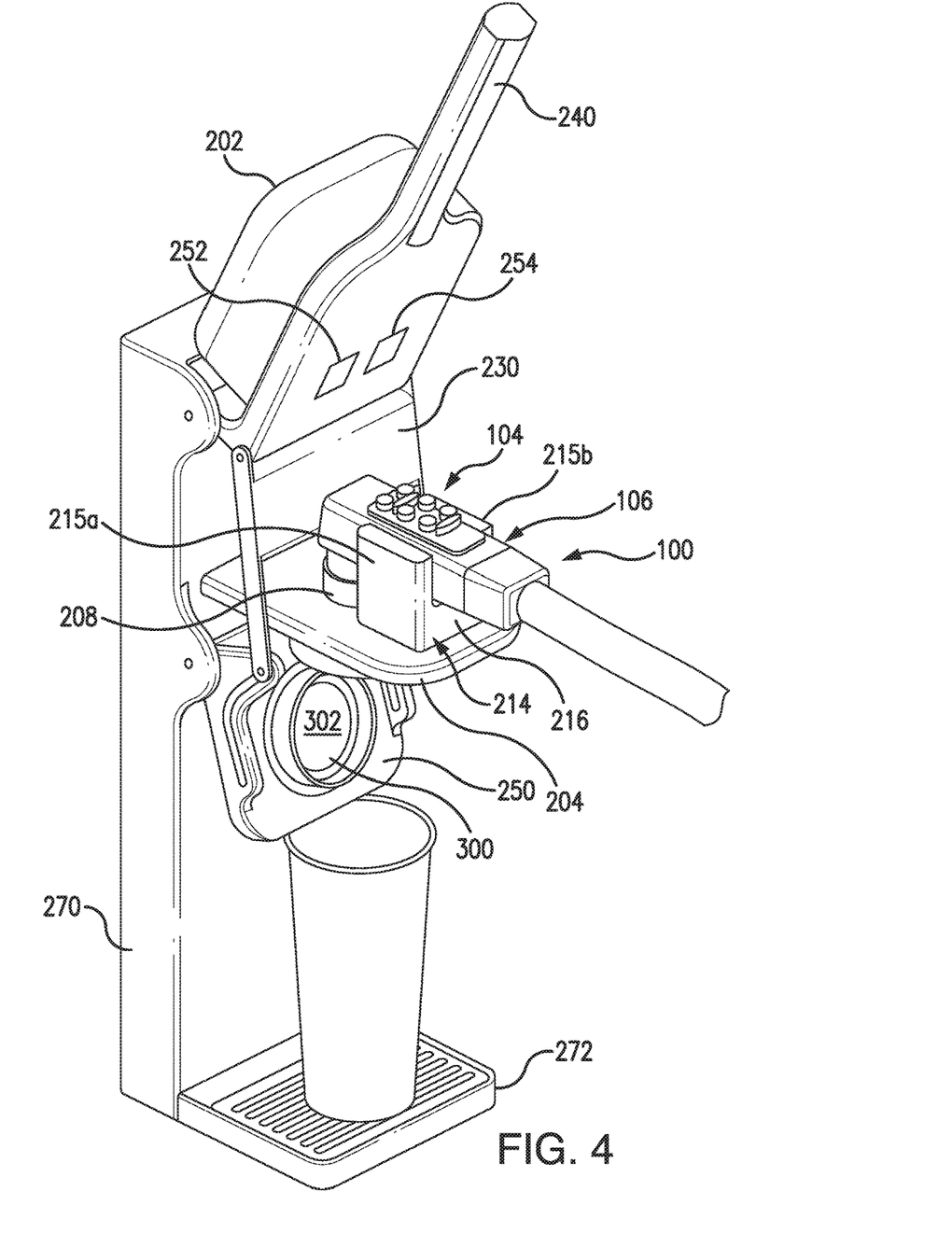
FIG. 4 is a perspective view of a beverage dispenser according to various aspects of the invention.

As shown in FIG. 1, dispenser 200 can include a tower 270, a tower orifice 274 that extends through a middle portion of tower 270, and tower base 272. As shown in FIG. 4, cover 202 can be connected to armature 240 and can cover water solenoid 254, soda solenoid 252 and a controller (not shown). Soda button 242 and water button 244 can be positioned on armature 240 and can control soda solenoid 252 and water solenoid 254, respectively, to activate the respective soda and water buttons on bar gun 100 when armature 240 is in a closed position. For example, selecting soda button 242 can send an electronic signal to the controller to activate soda solenoid 252 for a pre-programmed amount of time. When activated, soda solenoid 252 engages the soda water or carbonated water button on bar gun 100 to dispense soda water. Similarly, selecting water button 244 can send an electronic signal to the controller to activate water solenoid 254 for a pre-programmed amount of time. When activated, water solenoid 254 engages the still water button on bar gun 100 to dispense still water.

Stationary platform 204 can be fixed to tower 270. Bar gun holster 208, bar gun cradle 214, and cartridge coupling portion 209 can be fixed to stationary platform 204. In an aspect, stationary platform, bar gun holster 208, and bar gun cradle 214 can be formed as a unitary piece. Bar gun 100 can be positioned on dispenser 200 on stationary platform 204. Linkage 230 can connect armature 240 to cartridge platform 250. Cartridge platform 250 can include a cartridge nest 217. Bar gun cradle 214 and cartridge nest 217 can be releasably or fixedly coupled, for example through fastener systems, slidable dovetail systems, snap-fit, or the like. In some embodiments, dispenser 200 can include cartridge nest 217 as an integral component. In some embodiments, the bar gun holster 208 may be integrated in the stationary platform 204.

Figure 5:
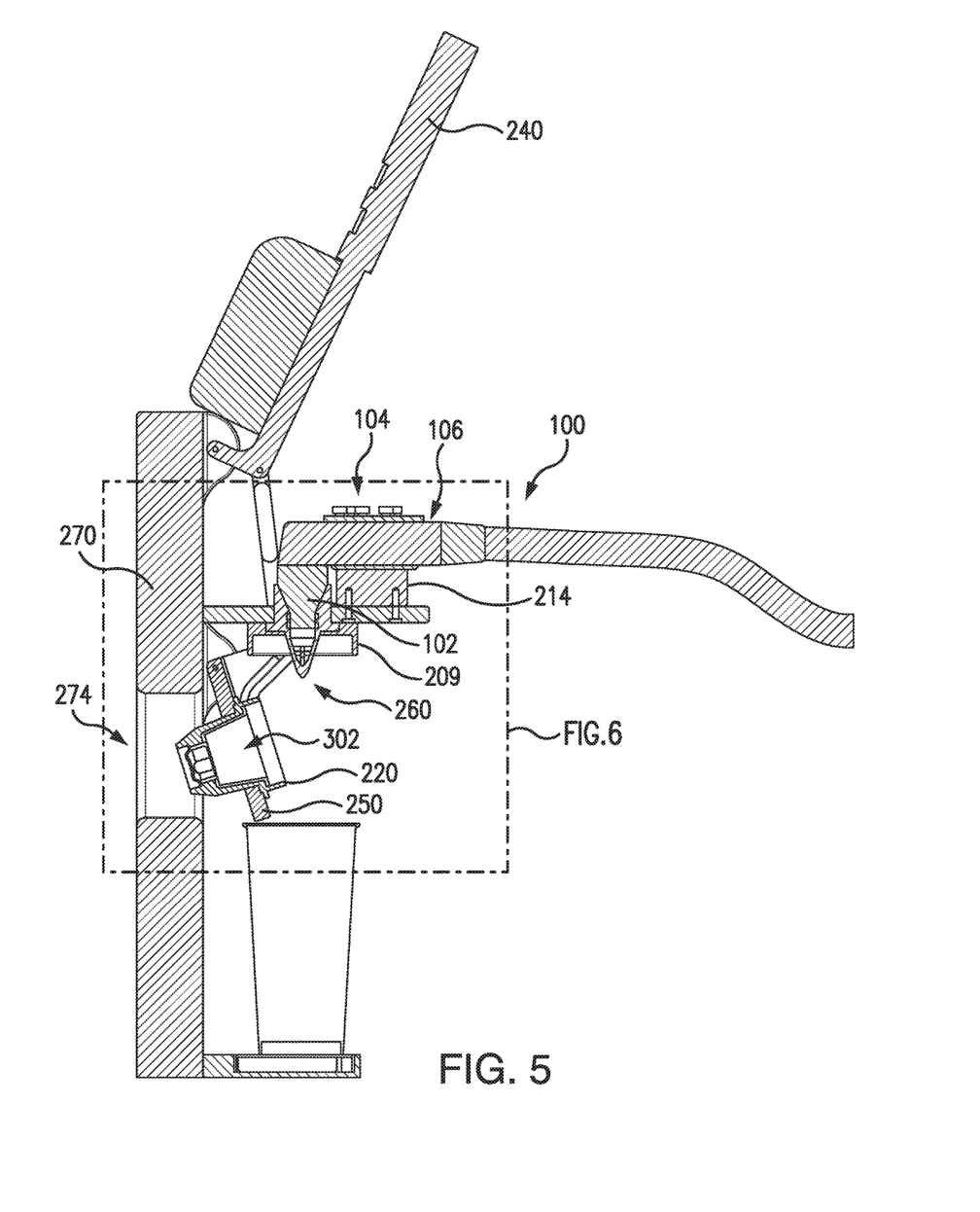
FIG. 5 is a side cross-sectional view of the beverage dispenser according to various aspects of the invention.

Bar gun 100 can include a bar gun nozzle 102 and bar gun buttons 104 (FIG. 5). Bar gun buttons 104 can activate a beverage dispensing function of the bar gun 100. In some embodiments, buttons 104 control flow of a fluid (e.g., still or carbonated water) pushed through nozzle 102 and cartridge 300, thereby mixing beverage ingredient 302 contained in cartridge 300 and fluid to produce a finished beverage.

Figure 2:
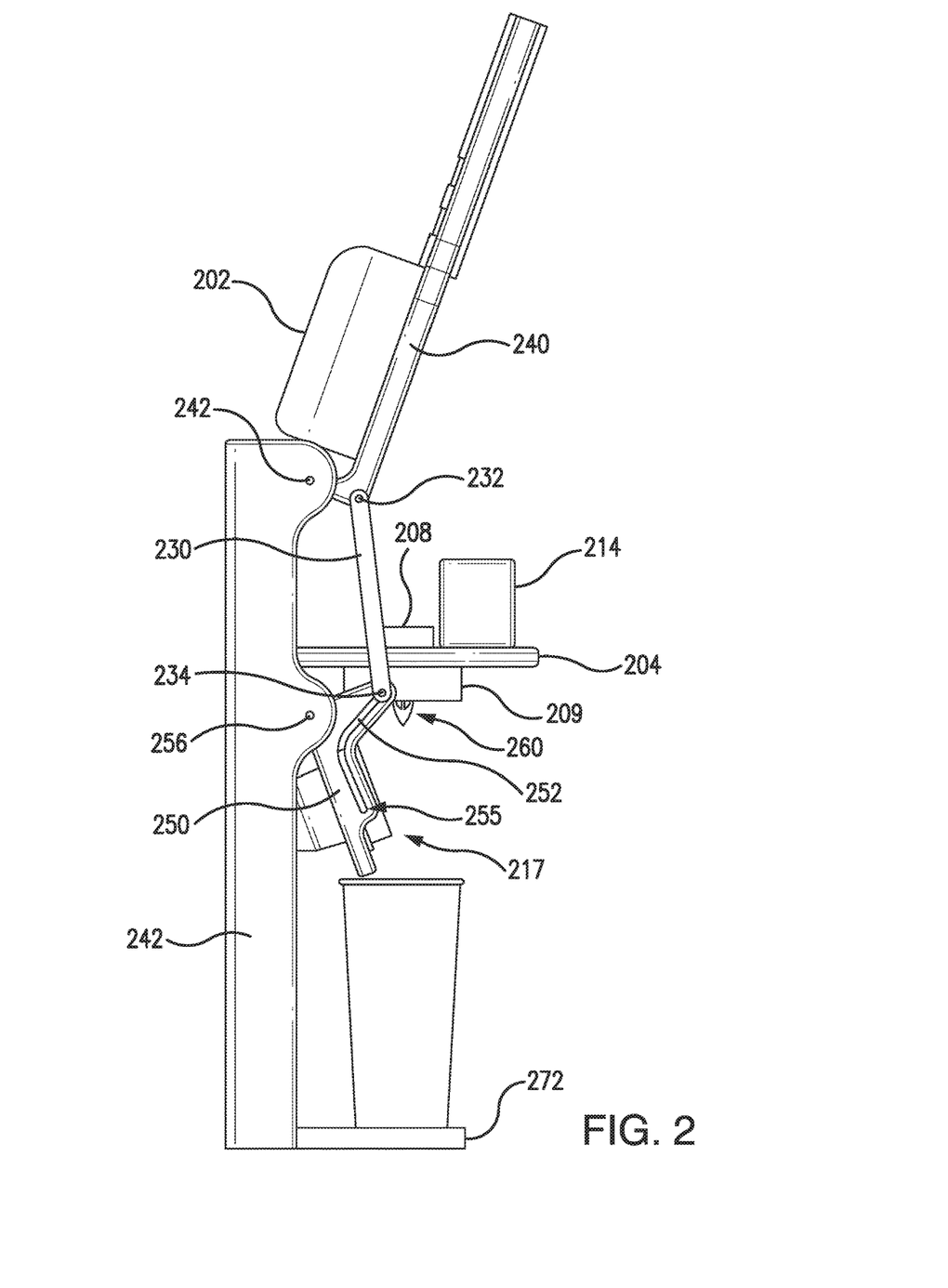
FIG. 2 is a side view of a beverage dispenser according to various aspects of the invention.
Figure 3:
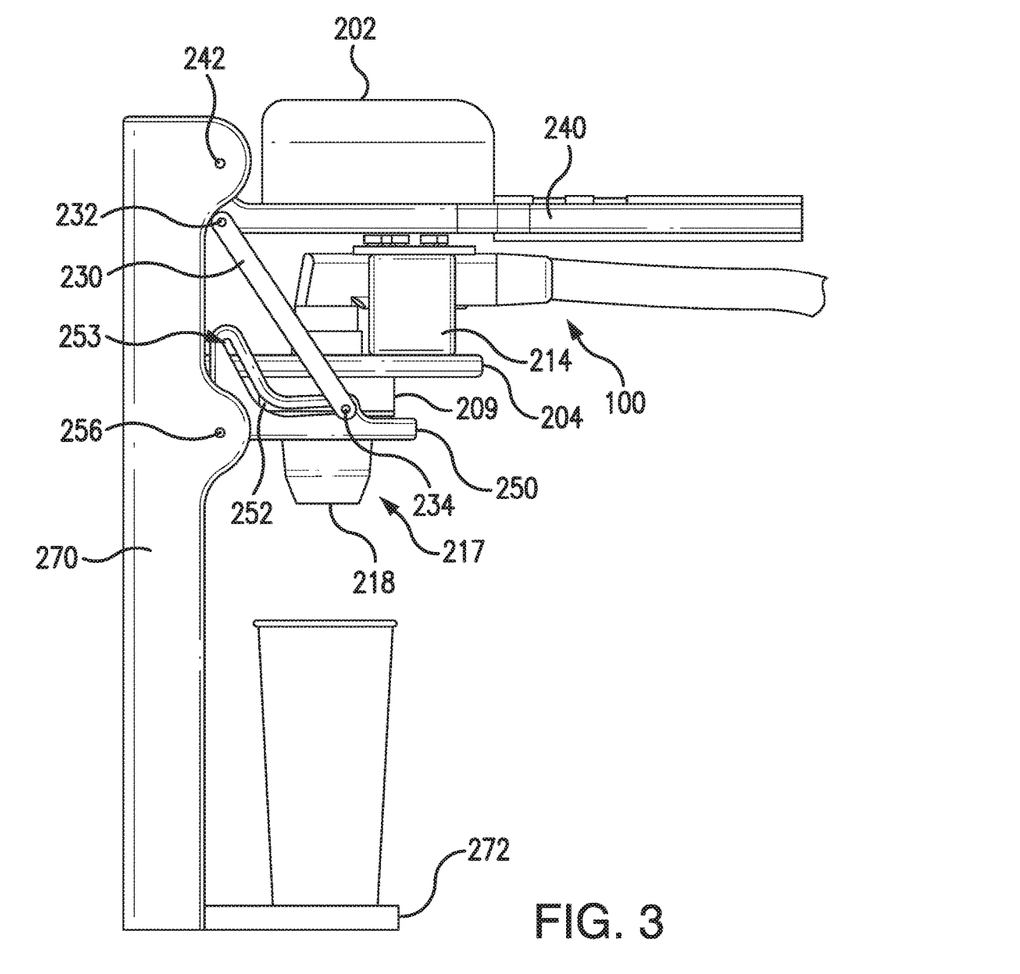
FIG. 3 is a side view of a beverage dispenser according to various aspects of the invention.
Figure 6:
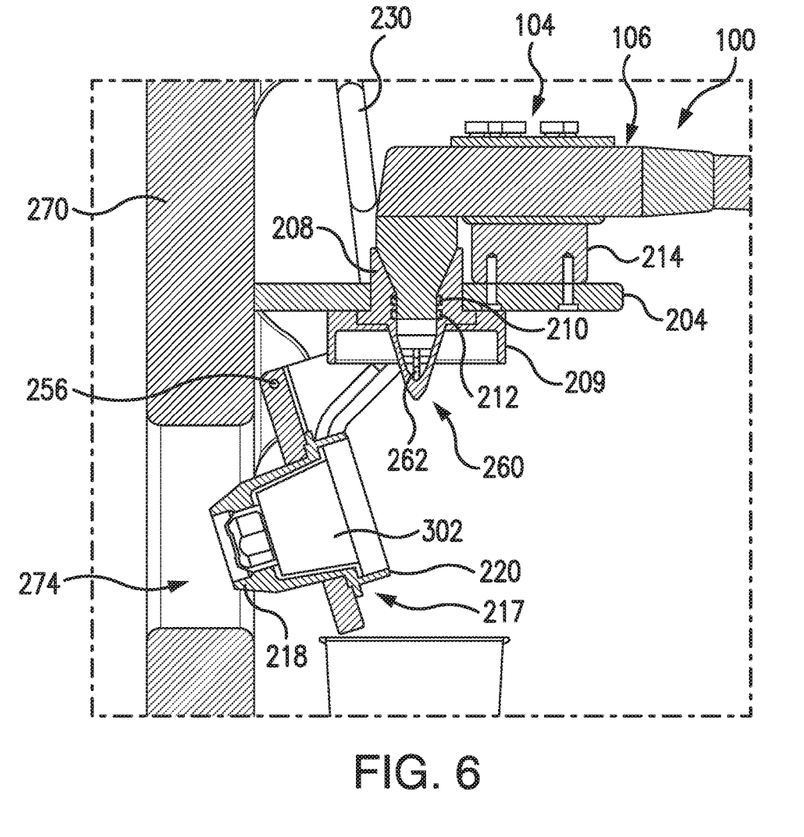
FIG. 6 shows a partial enlarged cross-sectional view from FIG. 5.

Referring to FIGS. 2-3, armature 240 can be pivotably connected to tower 270 at pin 242. Cartridge platform 250 can be pivotably connected to tower 270 at pin 256. Linkage 230 can be pivotably connected to armature 240 at pin 232. Linkage 230 can include a guide bearing 234. Guide bearing 234 can travel in channel 252 in cartridge platform 250 between first channel end 253 and second channel end 255. Armature 240, linkage 230, and cartridge platform 250 cooperatively move between an open position (e.g., FIG. 2) and a closed position (e.g., FIGS. 1 and 3). For example, for the open position, armature 240 can be moved upward away from tower base 272 and can rotate about pin 242. Armature 240 moves linkage 230 upward as linkage 230 rotates about pin 232. Guide bearing 234 on linkage 230 travels upwards in channel 252 toward first channel end 253 to allow cartridge platform 250 to move downwards into an open position. In the open position, a cartridge 300 can be loaded into cartridge nest 217 (FIG. 4). In the open position, dispensing portion 218 of cartridge nest 217 can extend into tower orifice 274 (FIGS. 5-6).

For the closed position, armature 240 can be moved downward toward tower base 272 and can rotate about pin 242. Armature 240 moves linkage 230 downward as linkage 230 rotates about pin 232. Guide bearing 234 on linkage 230 travels downward in channel 252 toward second channel end 255 to draw cartridge platform 250 upwards. In the closed position, armature 240 clamps bar gun 100 onto bar gun holster 208 and bar gun cradle 214 to hold bar gun 100 in place on dispenser 200.

Bar gun 100 can be positioned on stationary platform 204. For example, bar gun nozzle 102 can be positioned in bar gun holster 208. Bar gun handle 106 can be positioned in bar gun cradle 214. In one aspect, bar gun nozzle 102 can form an interference fit with bar gun holster 208 to form a fluid seal between bar gun nozzle 102 and bar gun holster 208. In another aspect, bar gun holster 208 can include one or more seals to abut bar gun nozzle 102. For example, bar gun holster 208 can include first nozzle seal 210 and second nozzle seal 212 to surround and form a fluid seal with bar gun nozzle 102, as shown in FIG. 6

Bar gun cradle 214 can include a first upright portion 215a, a second upright portion 215b, and a base portion 216 (FIG. 4). Bar gun handle 106 can rest on base portion 216 between first upright portion 215a and second upright portion 215b. In an aspect, first upright portion 215a and second upright portion 215b can be cantilevered from base 216 and can form an interference fit with the sides of bar gun handle 106 to hold bar gun handle 106 onto bar gun cradle 214. In an aspect, bar gun handle 106 can snap onto bar gun cradle 216.

In some embodiments, dispenser 200 can include a puncturing device 260 and a cartridge nest 217. Bar gun holster 208 can also include a cartridge coupling portion 209 (FIG. 6) configured to releasably couple to a cartridge 300 containing a beverage ingredient 302. Cartridge nest 217 can have a receiving portion 220 (FIG. 6) for receiving a portion of the cartridge 300. In use, the puncturing device 260 can be configured to puncture the cartridge 300, thereby releasing the beverage ingredient 302.

As shown in FIGS. 2-3, in some embodiments, cartridge platform 250 including cartridge nest 217 can be movable relative to stationary platform 204 and cartridge coupling portion 209 such that cartridges 300 can be loaded and unloaded into the cartridge receiving portion 220. In some embodiments, cartridge nest 217 can be configured to be adjustably mounted directly to bar gun nozzle 102. Cartridge nest 217 can include a dispensing portion 218 from which a finished beverage is dispensed. In some embodiments cartridge nest 217 can be disposed under nozzle 102.

Figure 7:
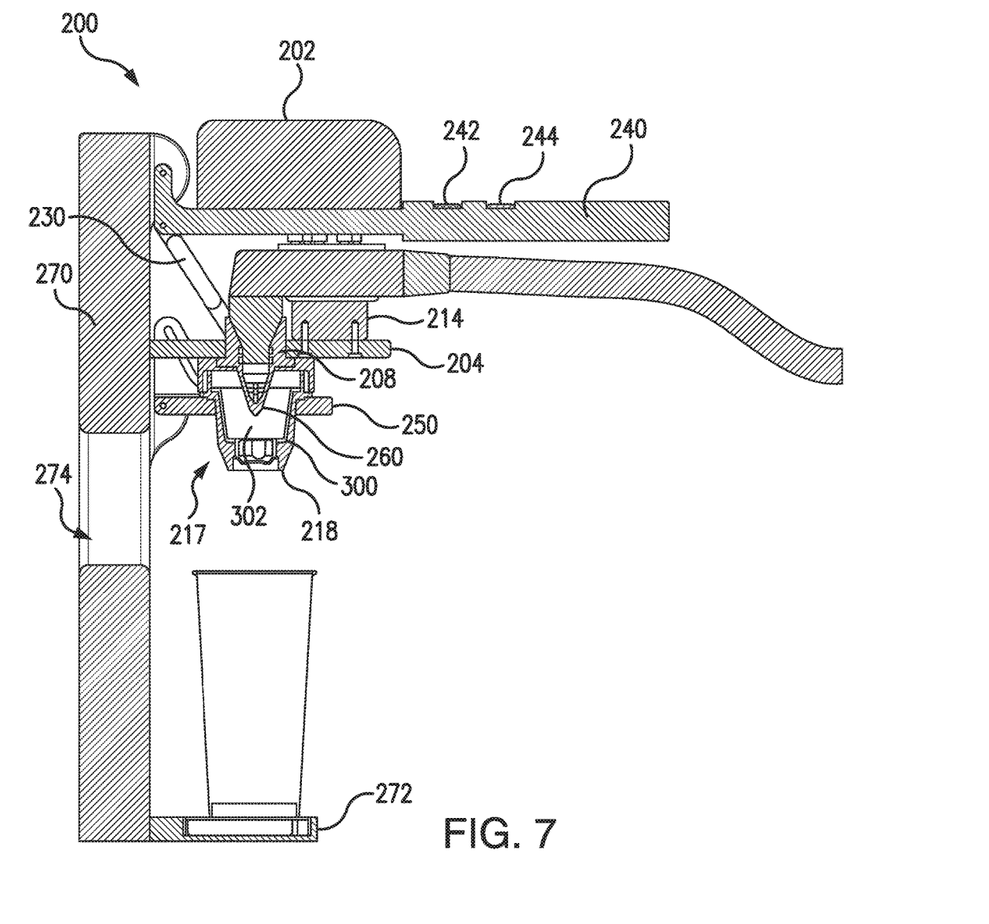
FIG. 7 is a side cross-sectional view of the beverage dispenser according to various aspects of the invention.
Figure 8:
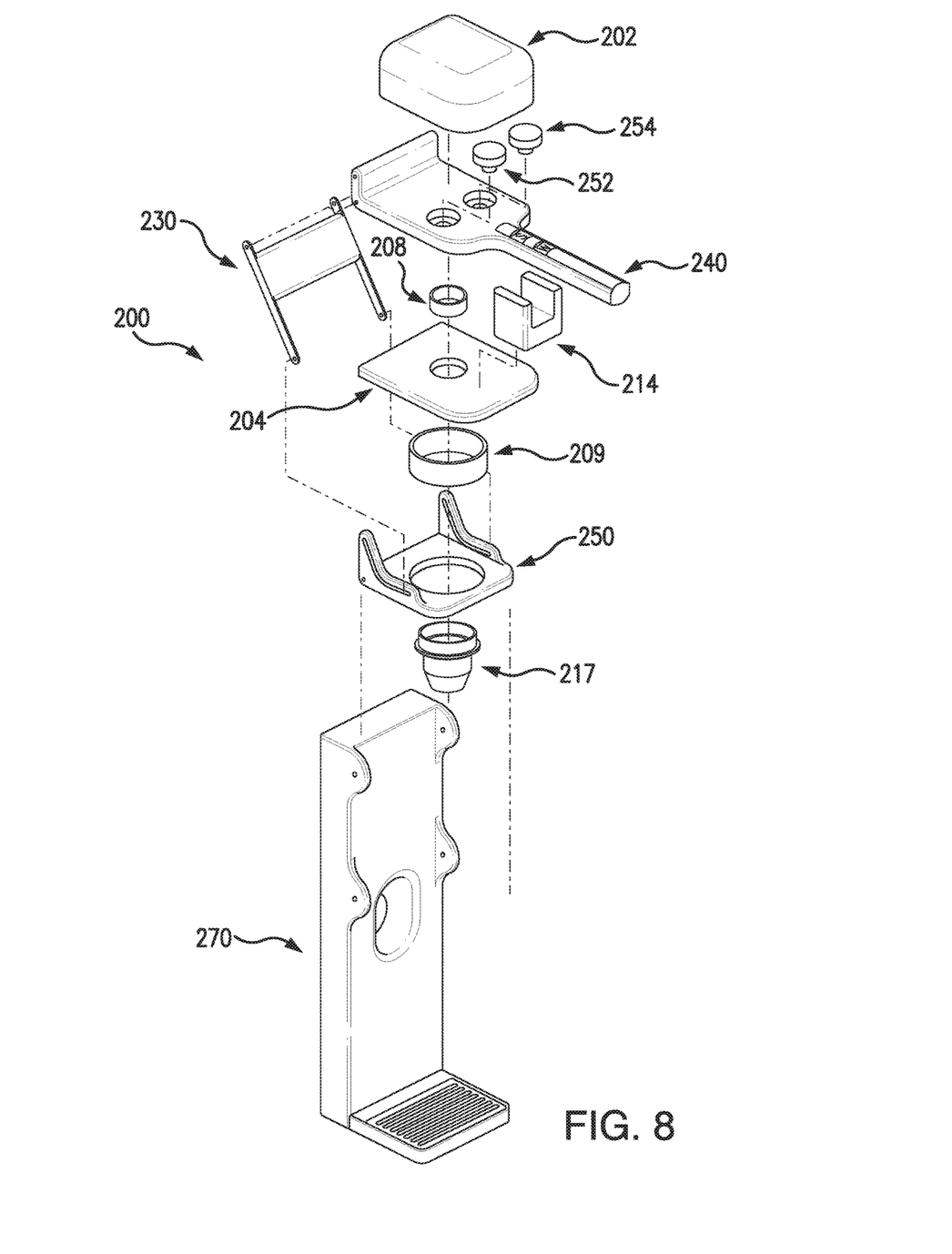
FIG. 8 is an exploded view of a beverage dispenser according to various aspects of the invention.

As shown in FIGS. 5-7, cartridge nest 217 may be configured to receive cartridge 300 such that the cartridge is closely held within a cavity, such that cartridge 300 is sealed within cartridge nest 217. Cartridge nest 217 and receiving portion 220 can be adjustably positioned below nozzle 102. In some embodiments, the action of positioning (e.g., opening and closing dispenser 200 by raising and lowering armature 240) cartridge nest 217 into position to allow for cartridge 300 to be placed or to couple cartridge nest 217 to nozzle adaptor 208 can be automated using one or more actuation components, such as, for example, electric motors, solenoids, and the like that are operatively connected to one or more of pin connections 232, 242, and 256. In some embodiments, the action of positioning cartridge nest 217 may be facilitated mechanically, such as by springs or compressible pistons. The electrical, mechanical, or electromechanical actuation components may be disposed in dispenser 200, or a structure adjacent the dispenser 200, including, but not limited to, a wall, countertop, table, or housing.

In some embodiments cartridge 300 contains a single serving of beverage ingredient 302. In some embodiments cartridge 300 is a part of a limited-time or limited geographic area offer. In some embodiments cartridge 300 can be a supplemental beverage flavoring such as cherry, lime, vanilla, orange, etc. In some embodiments the cartridge can be configured as a bag, shell, box, pod, or combinations thereof. In some embodiments cartridge 300 can be made of a shell material and a puncturable material, such as foil or paper. In some embodiments, cartridge 300 is reusable, and may for example be reused by a user to add or create a beverage ingredient 302.

In some embodiments, puncturing device 260 may couple with the bar gun holster 208, cartridge 300, or cartridge nest 217. In some embodiments, bar gun nozzle 102 may couple with the cartridge 300 or cartridge nest 217.

In embodiments, puncturing device 260 can include an injector 262 through which diluent, such as still or carbonated water, flows during use. In some embodiments, dispensing portion 218 can be configured to mix the fluid and beverage ingredient 302. In some embodiments, cartridge nest 217 can include a mixing portion at the distal end of the holster, where the fluid and beverage ingredient 302 may mix prior to being dispensed.

Some embodiments are drawn towards a method for producing a beverage, including providing a cartridge containing a beverage ingredient for a system, placing a bar gun on a bar gun cradle and positioning the bar gun nozzle in a bar gun holster, placing a cartridge in a cartridge nest having a receiving portion for receiving a portion of the cartridge, lowering an armature to secure a bar gun into place on the dispenser, selecting and pressing a diluent button to dispense diluent into the cartridge to release the beverage ingredient, and allowing the diluent and beverage ingredient to mix and produce a finished beverage.

Some embodiments are drawn towards a method for producing a limited-time-offer beverage. Such a method may include providing, receiving, or restricting access to a cartridge containing a beverage ingredient. In some embodiments the beverage ingredient may be provided on a restricted basis. In some embodiments, the beverage may be formed by a post-mix process. In some embodiments, the beverage may be formed by a pre-mix process. In embodiments, cartridge 300 may be engaged with cartridge nest 217 having a receiving portion for receiving a portion of the cartridge; a puncturing device; a bar gun holster configured to be coupled to the puncturing device, and a cartridge coupling portion configured to releasably couple to the cartridge; releasing the beverage ingredient from the cartridge; flowing a fluid through the dispenser system to allow the fluid to mix with the beverage ingredient and produce a finished beverage. In some embodiments the restricted basis is a limited time, for example less than six months, less than 3 months, less than 1 month. In some embodiments, the limited time may coincide with another limited time event, such as a first-run movie in theaters, sports franchise promotion, crowd-sourced flavor competition, and the like. In some embodiments the restricted basis is a limited geographical area, such as a limited country release, limited state release, or other limited locality release. In some embodiments, the limited geographical area may be a particular retail environment, such as a particular convenience store or restaurant, and the like. In some embodiments, the beverage ingredient may be a staple product for a company, and not linked to an LTO.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A beverage dispenser comprising:
a tower member;
an armature pivotably connected to the tower member;
a stationary platform fixed to the tower member, the stationary platform being configured to retain a bar gun;
a cartridge platform pivotably connected to the tower member; and
a linkage pivotably connected to the armature, the linkage including a guide bearing to travel in a channel formed in the cartridge platform between a first channel end and a second channel end to open and close the cartridge platform based on a position of the armature.

2. The beverage dispenser of claim 1, further comprising:
a bar gun cradle to hold a bar gun handle; and
a bar gun holster to hold a bar gun nozzle.

3. The beverage dispenser of claim 2, further comprising a first solenoid to actuate a first bar gun button, the first solenoid being controlled by a first input positioned on the armature.

4. The beverage dispenser of claim 3, further comprising a second solenoid to actuate a second bar gun button, the second solenoid being controlled by a second input positioned on the armature.

5. The beverage dispenser of claim 3, further comprising:
a puncturing device to puncture a cartridge containing a beverage ingredient to release the beverage ingredient;
a cartridge coupling portion connected to the stationary platform to releasably couple to the cartridge; and
a cartridge nest having a receiving portion for receiving a portion of the cartridge, wherein the puncturing device is configured to puncture the cartridge thereby releasing the beverage ingredient.

6. The system of claim 5, wherein activation of the first solenoid pushes a fluid through the bar gun nozzle and cartridge, thereby mixing the beverage ingredient and fluid.

7. The system of claim 5, wherein the cartridge nest is movable relative to the cartridge coupling portion such that cartridges can be loaded and unloaded into the cartridge nest.

8. The system of claim 5, wherein the cartridge contains a single serving of beverage ingredient.

9. The system of claim 5, wherein the cartridge comprises one of a bag, shell, pod, and box.

10. The system of claim 5, wherein the cartridge is reusable.

11. A beverage dispensing system, comprising:
a tower member;
an armature pivotably connected to the tower member;
a stationary platform fixed to the tower member;
a bar gun cradle positioned on the stationary platform;
a bar gun holster positioned on the stationary platform;
a cartridge coupling portion positioned on the stationary platform;
a cartridge platform pivotably connected to the tower member;
a linkage pivotably connected to the armature, the linkage including a guide bearing to travel in a channel formed in the cartridge platform between a first channel end and a second channel end to open and close the cartridge platform based on a position of the armature;
a bar gun, the bar gun having a handle positioned on the bar gun cradle and a nozzle positioned within the bar gun holster;
a puncturing device configured to puncture a cartridge containing a beverage ingredient thereby releasing the beverage ingredient; and
a cartridge nest positioned on the cartridge platform, the cartridge nest having a receiving portion for receiving a portion of the cartridge.

12. The system of claim 11, further comprising a first input positioned on the armature to control a first solenoid to activate a first bar gun button to push a first fluid through the bar gun nozzle and cartridge, thereby mixing the beverage ingredient and first fluid.

13. The system of claim 11, further comprising:
a first input positioned on the armature to control a first solenoid to activate a first bar gun button to push a first fluid through the bar gun nozzle and cartridge, thereby mixing the beverage ingredient and first fluid; and
a second input positioned on the armature to control a second solenoid to activate a second bar gun button to push a second fluid through the bar gun nozzle and cartridge, thereby mixing the beverage ingredient and fluid.

14. The system of claim 11, wherein the cartridge nest is movable relative to the cartridge coupling portion such that cartridges can be loaded and unloaded into the cartridge receiving portion.

15. A method for producing a beverage, comprising:
placing a bar gun having a bar gun nozzle and a bar gun handle on a stationary platform of a dispenser, the stationary platform being fixed to a tower member and having a cartridge coupling portion;
positioning a cartridge within a cartridge nest attached to a cartridge platform pivotably connected to the tower member, the cartridge nest having a receiving portion for receiving a portion of the cartridge;
moving an armature downward toward a tower member base such that the armature rotates about a pin connecting the armature to the tower member, the armature being pivotably connected to a linkage such that moving the armature downward moves the linkage downward, the linkage having a guide bearing that travels along a channel positioned in a cartridge platform toward a first channel end such that moving the armature downward draws the cartridge platform upward into engagement with the cartridge coupling portion to releasably couple to the cartridge;
puncturing the cartridge with a puncturing device to release a beverage ingredient from the cartridge;
flowing a diluent to allow the diluent to mix with the beverage ingredient and produce a finished beverage.

16. The method of claim 15, further comprising:
selecting an input corresponding to a first diluent to push the first diluent into the nozzle thereby mixing the beverage ingredient and first diluent.

17. The method of claim 15, further comprising:
providing a first input corresponding to a first diluent;
providing a second input corresponding to a second diluent;
selecting the first input or the second input to push the first diluent or the second diluent into the bar gun nozzle thereby mixing the beverage ingredient and first diluent or the second diluent.

18. The method of claim 15, further comprising:
moving the armature upward away from the tower member base such that moving the armature upward moves the linkage upward and the guide bearing travels toward a second channel end allowing the cartridge platform to move downward and disengage from the cartridge coupling portion;
removing the punctured cartridge;
positioning a second cartridge within the cartridge nest;
moving the armature downward toward the tower member base to move the linkage downward such that the guide bearing travels along the channel toward the first channel end to draw the cartridge platform upward into engagement with the cartridge coupling portion to releasably couple to the second cartridge;
puncturing the second cartridge with the puncturing device to release a second beverage ingredient from the second cartridge;
flowing the diluent to allow the diluent to mix with the second beverage ingredient and produce a second finished beverage.

19. The method of claim 18, wherein the cartridge nest moves to a position within a tower member orifice when the armature is moved upward.

20. The method of claim 16, wherein selecting the input activates a solenoid to engage a bar gun button to push the first diluent into the nozzle.

\* \* \* \* \*